United States Patent [19]
Troughton

[11] 3,733,670
[45] May 22, 1973

[54] APPARATUS FOR MAKING FOOD CONTAINERS

[75] Inventor: Thomas D. Troughton, Richmond, Calif.

[73] Assignee: Rheem Manufacturing Company, New York, N.Y.

[22] Filed: June 29, 1972

[21] Appl. No.: 267,498

Related U.S. Application Data

[63] Continuation-in-part of Ser. No. 25,637, April 6, 1970.

[52] U.S. Cl. .................29/200 A, 29/200 B, 29/460, 219/59, 219/105, 228/30
[51] Int. Cl...........................B23p 19/00, B23p 3/00
[58] Field of Search .......................29/200 B, 200 A, 29/460, 200 R, 430; 228/30; 219/59, 105

[56] References Cited

UNITED STATES PATENTS

| | | | |
|---|---|---|---|
| 2,535,836 | 12/1950 | Cameron et al. | 228/30 X |
| 3,230,615 | 1/1966 | Krengel et al. | 29/200 B |
| 3,256,592 | 6/1966 | Krengel et al. | 29/200 B |
| 3,561,096 | 2/1971 | Krengel et al. | 29/460 |
| 3,523,513 | 8/1970 | Maier | 219/59 |
| 3,597,574 | 8/1971 | Erlandson | 219/105 |

Primary Examiner—Thomas H. Eager
Attorney—Joseph B. Gardner

[57] ABSTRACT

Apparatus for making tin lined drums and other large containers adapted for use in storing and shipping food products. The apparatus is particularly concerned with making the shell or body tube for such a container, and it utilizes as the starting material for the body tube a flat metal sheet plated along at least one side thereof with a layer of tin and formed into a tube having overlapping longitudinal edges and the layer of tin disposed within its interior. The apparatus includes welding mechanism located along a conveyor adapted to transport such body tube through an operating station at which the welding mechanism is effective to secure the overlapping edge portions of the body tube one to another. The apparatus further includes an abrading brush operative to scale the inner surface of the body tube along the welded edge portions thereof, and it still further includes tin spraying mechanism for spraying molten tin onto the inner surface of the body tube along its welded overlapping edge portions. The brush and spraying mechanism are carried by boom structure supported with respect to the conveyor so as to pass through the interior of any body tube transported thereby; and the brush, spraying mechanism, and welding mechanism have particular mechanical and functional relationships with respect to each other, to the conveyor, and to any body tube being transported by the latter.

15 Claims, 8 Drawing Figures

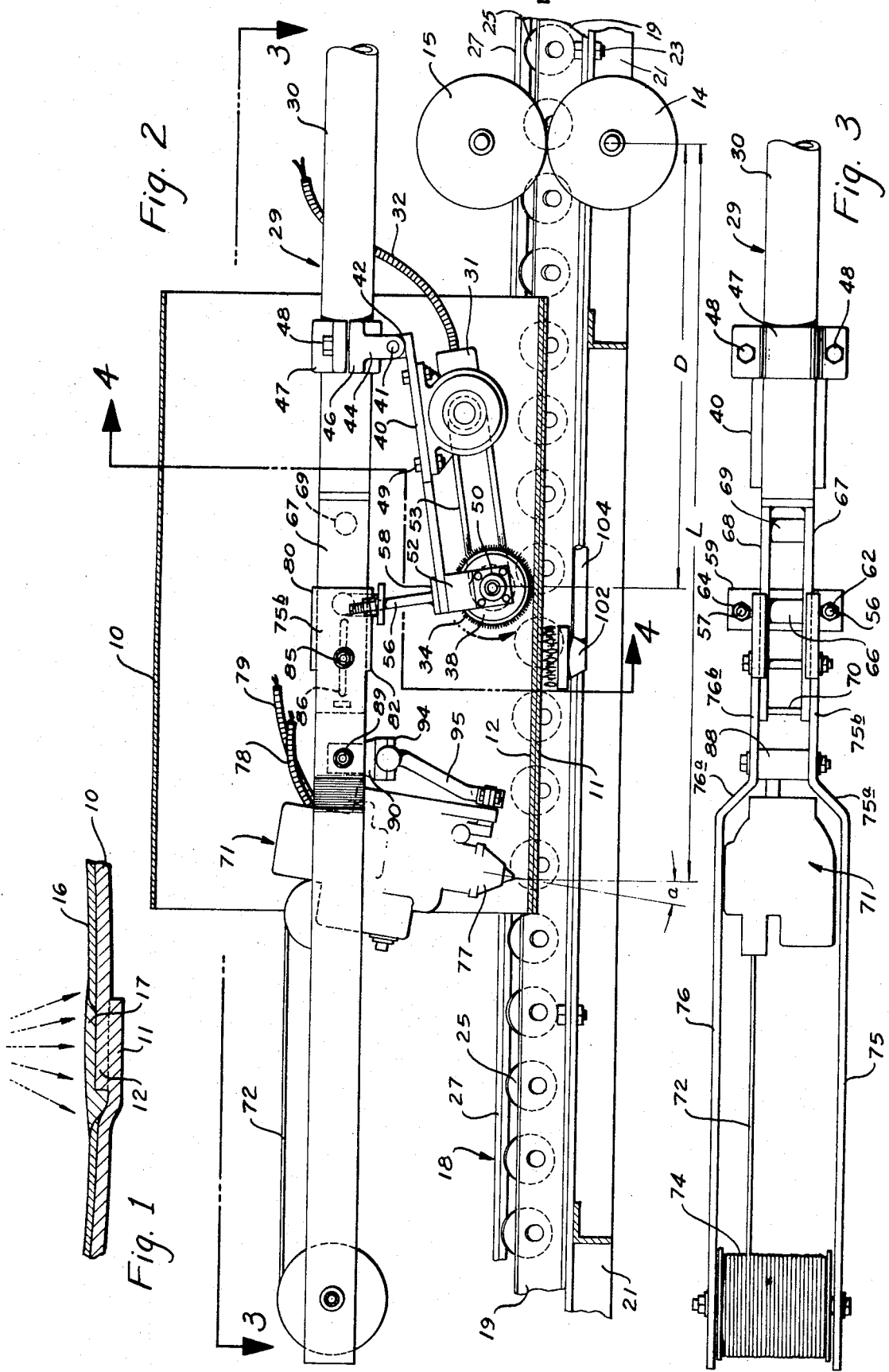

PATENTED MAY 22 1973 3,733,670

APPARATUS FOR MAKING FOOD CONTAINERS

RELATED APPLICATION

This application is a continuation-in-part of copending patent application Ser. No. 25,637, filed Apr. 6, 1970.

This invention relates to apparatus for making containers and, more particularly, to apparatus for making the shell or body tube of a large metal container intended for use in storing and shipping food products and the like.

As explained in the aforementioned copending patent application, until recent years metal containers of the type in which food products are shipped and sold have been of very limited volume with the number 10 can being about the largest container available for this purpose. In recent years, however, larger containers have come into use and the 55 gallon drum is an example thereof, it being the largest container presently used for shipping and storing food products. Such drums, and their smaller counterparts which are known as "pails," have the shells or body tubes thereof (which are usually but not necessarily cylindrical in cross-section) formed from flat steel sheets bent into a cylindrical configuration with the longitudinal edge portions thereof overlapped and welded together, thereby constraining each metal sheet in its tubular form and establishing a seal along the side seam defined by the overlapping edge portions. Thereafter, the interior of the shell is plated with a layer of tin to enable the shell to withstand attack thereon by the organic acids of the food products packaged within the completed container.

Respecting the requirement for tin plating, it has long been known that food products attack the containers in which they are stored, and as concerns metal and particularly steel containers the attack thereon is attributable in a large measure to the organic acids in the food products. The acidic attack on the metal consumes the same and causes hydrogen gas to be evolved in the process, thereby elevating the pressure within the container until the combination of the increased pressure and weakened surface areas of the container cause the latter to puncture or spring a leak at the weakest location. Once leakage occurs, the container and its contents are destroyed.

In order to reduce the rate of attack of the food acids on the steel containers, it is conventional practice to plate at least the inner surfaces of each container with a coating or layer of tin which serves as a sacrificial cathode protecting the steel container from direct attack until the tin has been consumed. The tin-plated inner surface of the food container provides a rather complex protective mechanism that involves barrier layers respectively formed along the union of the tin and steel surfaces and along the outer surface of the tin (the outer barrier layer is often supplemented by coating the tin with a synthetic plastic material such as one of the oreoresinous materials used for this purpose), and a free tin layer located between the two barrier layers. A grading system is used to rate the quality of the tin plating in a food container so as to predict the storage life thereof, and such system takes into account the presence or absence of the barrier layers and the amount of free tin available for dissipation. It may be noted that the extent to which free tin available for sacrifice to the organic acids determines what, if any, barrier layers are necessary.

As previously stated, all of the pail-and drum-size containers used for storage and shipment of food products have heretofore had the shell or body tube thereof provided with the requisite coating of tin along their inner surfaces after being shaped and welded. The reason therefor is that no practicable procedure has been known to protect only the welded seam of a container shell with a coating of tin after formation thereof which is necessary because either welding destroys any prior tin plating along the overlapped edges or the tin along such edges is removed preparatory to welding the same, depending upon the type of welding equipment used. Although the large food containers manufactured by first forming and welding the overlapped edge portions of a steel sheet to construct the body tube and then plating the entire inner surface thereof with the necessary layer of tin are very satisfactory from the point of view of use, they are nevertheless quite costly to make because it is difficult and expensive to coat the inner surface of the body tube or shell after it has been formed.

Accordingly, it is an object of the present invention to provide improved apparatus for making relatively large metal containers for food products and the like, and which containers have the shells or body tubes thereof formed from flat steel sheets that have previously been coated or plated along at least one side thereof with a layer of tin and are rolled or otherwise formed into a tubular configuration with the longitudinal edge portions thereof overlapping.

Another object of the invention is that of providing improved apparatus of the character described for making the shells of body tubes of large containers for food products, such as 55 gallon drums and pails of various capacities intermediate the number 10 can and 55 gallon drum, and which apparatus is operative to replace the tin coating destroyed or reduced in effectiveness by the welding process, or the preparatory operations therefor, which sealingly joins the overlapping edge portions of the sheet.

Still another object is in the provision of improved apparatus of the type described which includes a conveyor, welding mechanism, scaling means, and tin spraying mechanism; all of which are positionally and functionally interrelated one to another so as to permit utilization of a portion of the residual heat conducted by the metal sheet from the restricted vicinity of the weld therealong throughout a band of substantial width generally overlying and bordering the welded edge portions or seam to deposit a layer of tin therealong replacing the tin coating destroyed or damaged by the intense localized heat developed during the welding process.

A further object of the invention is to provide apparatus having the functional and mechanical interrelationship of components as described, and which relationships enable, either in full or in part, the supplemental or added tin layer along the overlapping edge portions of the body tube to be reflowed following deposition by utilizing the residual heat radiating outwardly from the localized area of the weld joining the two edge portions of the body tube, thereby enabling the supplemental tin layer to be integrated with the original tin coating and, at the same time, reduce somewhat the porosity of the spray-deposited layer so as to retard the rate at which it is sacrificed to the organic acids in the food products stored within the finished container.

Yet a further object is that of providing apparatus of the type described that is characterized by high speed production, requiring only a very minimum set up time for initiating operation, significantly minimizing the loss of tin, and also substantially reducing rejects or defective body tubes.

Still a further object is in the provision of apparatus for applying molten tin to the heated edge portions of a body tube, all as previously described, and in which various components of the apparatus are adjustably interrelated so as to enable the same to have the desired degree of accuracy and refinement to produce an acceptable commercial product within the parameters imposed by commercial operations.

Additional objects and advantages of the invention, especially as concerns particular features and characteristics thereof, will become apparent as the specification continues.

Generally summarized, the apparatus includes conveyor mechanism adapted to transport from one location to another therealong a body tube having the longitudinal edge portions thereof overlapping. Disposed along the conveyor at spaced apart locations are welding mechanism operative to weld the overlapping edge portions of such body tube, scaling means downstream of the welding mechanism for cleaning the inner surface of the welded edge portions, and a tin spraying mechanism for depositing molten tin onto the cleaned inner surface of the welded edge portions of the body tube. The spraying mechanism is oriented and disposed in relatively close proximity to the inner surface of such body tube and angled downstream with respect thereto, and the scaling means which may take the form of a wire brush is rotated so as to direct scale away from the spraying mechanism and the bristles of the brush are constrained against lateral or transverse spreading so as to confine the scaling operation to a well-delineated path. Various adjustments are incorporated into the apparatus so that important dimensional and positional relationships can be observed, and supplemental heat may be added to the body tubes by a heater provided for this purpose.

An embodiment of the invention is illustrated in the accompanying drawing, in which:

FIG. 1 is an enlarged, transverse sectional view of the side seam of a body tube illustrating the configuration thereof as a coating of tin is applied to the welded overlapping edge portions of the tube;

FIG. 2 is a broken longitudinal sectional view illustrating the operating station at which a body tube is being processed and the apparatus used therefor;

FIG. 3 is a broken top plan view taken generally along the line 3—3 of FIG. 2;

Figure 4:
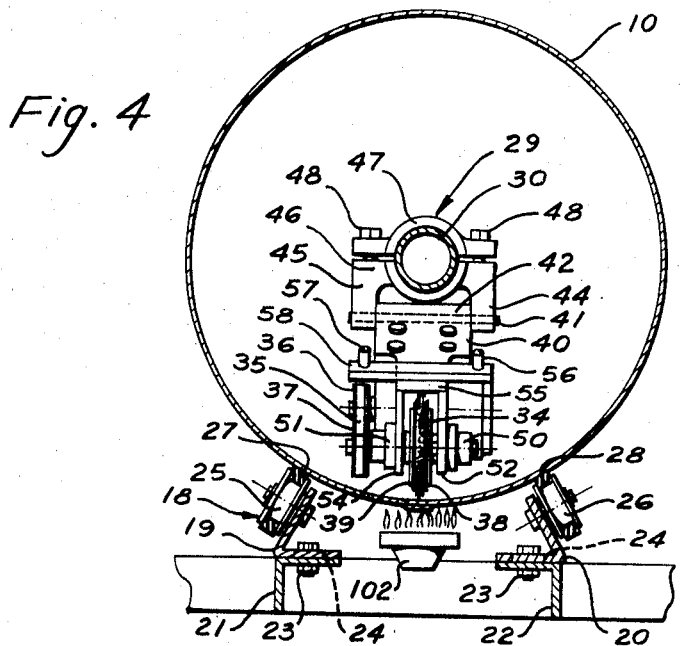
FIG. 4 is a vertical sectional view taken along the line 4—4 of FIG. 2.

Prior to explaining in detail the apparatus for making body tubes or shells for relatively large containers, it may be noted that body tubes of this type are generally old in a structural sense because they have been formed heretofore in an entirely different manner. Accordingly, much of the apparatus used in fabrication of the body tubes is old and well-known in the art, and for this reason, the details of such apparatus not pertinent to the particular invention will not be included herein.

In the drawings, the shell or body tube is denoted generally with the numeral 10, and it has overlapping edge portions 11 and 12 which are integrated or fused, as shown in FIG. 1, by a thermal welding process, which, for purposes hereof, may be essentially conventional. In FIG. 2, standard rotatable welding electrodes 14 and 15 are shown which rollingly engage the respective edge portions 11 and 12 and effect fusion thereof. The welding process practiced is a seam welding technique in which the electrical resistance of the edges 11 and 12 is used to generate the temperature required to fuse the edges upon application thereto of the restricted compressive force developed thereagainst by the electrodes 14 and 15. Thus, no material is added to the edges 11 and 12 to effect joinder thereof, and the end result is a continuous seam therealong formed by utilizing conventional resistance welding techniques. By way of illustration, the edges 11 and 12 may be overlapped by about one-eighth of an inch, and the body tubes 10 in a typical fabrication line are advanced between the welding electrodes 14 and 15 at a rate of about 35 to 40 feet per minute. The high value current passed through the overlapping edge portions 11 and 12 by the electrodes 14 and 15 elevates the temperature of the edge portions to the order of 2400°F which fuses or thermal welds such edge portions to each other.

The particular metal thickness used to form the body tube 10 will depend to a considerable extent upon the size or capacity of the container. By way of example, the body tube for a 55 gallon drum used to ship and store food products may be 18 gage commercial quality cold rolled steel, the thickness of which at the midpoint of the gage range is 0.047 inch. A smaller container such as a 10 gallon pail may be formed of 26 gage commercial quality cold rolled steel which has a midpoint gage range of 0.0175 inch. Alternatively, such 10 gallon pail might be formed from 135 pound basis box tin coated black plate steel having a thickness of about 0.0152 inch and being covered with a ½ pound coating of tin on each side thereof over the basis box area (i.e. 31,360 square inches).

It should be understood that in use of the present apparatus, the body tube 10 is formed from flat steel sheeting that is plated along at least one side thereof (i.e., the inside of the body tube) prior to formation of the tube by shaping a sheet into the generally cylindrical form shown in FIGS. 2 and 4 and prior to welding of the overlapping edge portions 11 and 12 thereof to each other. This condition of the body tube 10 is illustrated in FIG. 1 in which the tube is shown to be provided with a coating 16 along its inner surface. As explained in detail hereinafter, a layer of tin 17 is sprayed onto the inner surface of the tube 10 along the welded overlapping edges 11 and 12 thereof so as to replace the tin coating removed or otherwise damaged in whole or in part by the welding operation. As seen in FIG. 1, the layer 17 has a somewhat greater thickness than that of the tin coating 16 originally covering the inner surface of the tube, but the difference in thickness is only a few thousands of an inch. This difference in thickness has been exaggerated somewhat in FIG. 1 for illustrative purposes to make it quite evident by visual comparison of the original coating 16 with that of the spray-deposited coating 17. By way of example, the thickness of the tin coating 16 may be about 0.015 of an inch and the coating 17 may be slightly thicker, say about 0.017 of an inch.

The reason for increasing the thickness of the tin coating 17 slightly is to provide an additional quantity of available free tin for protection of the steel base material in the general vicinity of the welded edge portions 11 and 12 since an inner barrier layer otherwise present along the contiguous surfaces of the steel sheet and tin plating 38 thereon is not present, at least to the same extent, along the contiguous surfaces of the steel sheet and spray-deposited layer. Availability of an excessive quantity of free tin is a precautionary feature, and the amount of tin deposited is readily determined by adjustment of the apparatus, as will be explained hereinafter.

Referring now to FIGS. 2 and 4 in particular, the conveyor apparatus is seen which is used to advance body tubes 10 through an operating station at which the various fabrication procedures are performed. In this general reference, the conveyor is substantially conventional and is denoted in its entirety with the numeral 18. The apparatus shown includes transversely spaced side rails 19 and 20 that extend longitudinally and may have a somewhat V-shaped configuration. The side rails 19 and 20 are supported upon a platform or table defined, at least in part, by standards 21 and 22. Various fastening arrangements may be used to interconnect the side rails and standards respectively associated therewith, and in the form shown, the illustrative fastener means includes nut-equipped bolts 23. The bolts extend through transversely elongated slots 24 provided in the side rails 19 and 20, thereby enabling the transverse spacing between such side rails to be selectively adjusted. More importantly, such bolt fasteners 23 enable one rail to be shimmed or otherwise raised relative to the other to level the rails, thereby obviating any tendency for the body tube 10 to climb in one direction or the other as it is transported by the conveyor mechanism 18.

A plurality of rollers or idler sheaves 25 and 26 are respectively supported by the side rails 19 and 20 at longitudinally spaced locations therealong, and entrained about such sheaves so as to be supported thereby are endless conveyor belts 27 and 28 that are adapted to receive and support body tubes 10 thereon and propel the same from right to left, as viewed in FIG. 2, and thereby transport each body tube downstream through the operating station. Adjacent one end (not shown) the endless belts 27 and 28 are driven, all as is well known in the conveyor art.

Disposed along the conveyor 18 is elongated longitudinally extending boom structure 29 supported relative to the conveyor so as to pass through the interior of any body tube 10 transported thereby through the operating station. The boom 29 is supported in a cantilever fashion at the rear or upstream end thereof (not shown), and it is essentially parallel to the conveyor and is spaced thereabove. Evidently, the support for the boom 29 must be disposed at a position along the conveyor 18 prior to the location at which each flat metal sheet used to form a body tube 10 is rolled into the cylindrical configuration defining the same. It may be noted that a boom of this general type is old and well known as respects the means for supporting the same in its association with a drum conveyor. Accordingly, specific support structure interrelating the boom 29 and conveyor is not shown in the drawings and will not be described herein.

The boom structure 29 in the form thereof shown includes a hollow cylindrical or generally tubular section 30 supporting therealong an electric motor 31 that receives energizing power via electric conductors mounted within a cable 32 extending along the boom to the base or supported end thereof. The apparatus further includes means for scaling the inner surface of the body tube 10 along the welded edge portions 11 and 12 thereof to clean the same preparatory to the receipt by such edges of a coating of tin. In the form shown, the scaling means is an abrading device 34 also supported by the boom section 30 and rotatably driven by the motor 31 by means of an endless belt 35 extending therebetween and entrained about sheaves 36 and 37 respectively associated with the motor and abrading device, as shown best in FIG. 4. It will be apparent that the abrading device 34 is operative to remove loose scale and similar matter formed along the inner seam surface of the body tube 10 as a consequence of the welding operation effected by the welding electrodes 14 and 15.

Figure 5:
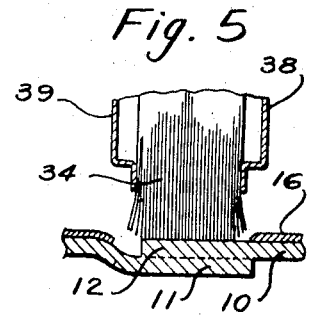
FIG. 5 is an enlarged broken vertical sectional view showing a portion of the scaling brush forming a part of the apparatus located at the operating station.

In more particular terms, the abrading device 34 is a wire brush rotatably driven in a counterclockwise direction, as viewed in FIG. 2, so that scale removed from the body tube 10 is directed upstream along the conveyor mechanism 18. The bristles of the abrading brush 34 are confined in a transverse direction so that they do not spread significantly and thereby cause a relatively narrow, well defined band to be cleaned along the length of the overlapping edge portions 11 and 12. Confining the bristles transversely prevents excessive quantities of the tin coating 16 to be damaged along the marginal edge portions thereof bordering the welded side seam of the body tube 10, thereby assuring adequate coverage of the marginal edge portions of the tin coating by the spray-deposited coating 17, as shown in FIG. 1. The bristles of the wire abrading device 34 are confined by side plates 38 and 39 (see FIG. 5, in particular) which are respectively disposed along the transverse sides of the brush and project outwardly toward the cylindrical surface thereof and into close proximity therewith. In a typical embodiment of the invention, the spacing between the outer extremities of the bristles of the abrading device 34 and corresponding edges of the confining plates 38 and 39 is approximately 3/8th of an inch.

The motor 31 and abrading device 34 are both mounted upon and carried by a plate 40 that is pivotally supported adjacent the upstream end thereof by a pin 41 extending through an upstanding boss 42 provided by the plate and journalled at the outer ends thereof in depending legs 44 and 45 that are transversely spaced to as to straddle the plate and are provided by the lower or bottom section 46 of a clevis, and which section has a semicylindrical seat adapted to receive therein the tubular boom section 30. The clevis has an upper section 47 provided with a complimentary semicylindrical center portion adapted to be seated upon the boom section 30 and secured to the lower clevis section 46 by a plurality of cap screws 48. It will be apparent that the mounting plate 40 is pivotally movable about the axis of the pin 41 in both clockwise and counterclockwise directions, as viewed in FIG. 2, and that the longitudinal position of the plate 40, and therefore of the motor 31 and abrading device 34, is selectively adjustable by loosening the cap screws 48 and sliding the clevis 46,47 to the desired location along the boom section 30. Similarly, the transverse position of the plate 40 can be altered slightly by angularly displacing the clevis 46,47 about the longitudinal axis of the boom section 30 in either clockwise or counterclockwise directions, as viewed in FIG. 4.

The motor 31 depends from the plate 40 adjacent the pivoted end portion thereof, and it may be secured to the plate by any suitable means, such as the plurality of bolts 49 shown. Analogously, the abrading device 34 depends from the plate 40 and is journalled for rotation in bearing structures 50 and 51 respectively associated with the transversely spaced depending legs 52 and 54 of a bracket 55 welded or otherwise fixedly related to the plate 40 at the end thereof remote from the pivot pin 41. Accordingly, the combinative weights of the motor 31, abrading device 34, and plate 40 cause the entire assembly to pivot downwardly in a counterclockwise direction about the axis of the pin 41 (as viewed in FIG. 2) wherefore the abrading device is gravity-biased into engagement with the overlapping edge portions 11 and 12 of a body tube 10 transported through the operating station by the conveyor apparatus 18.

Figure 8:
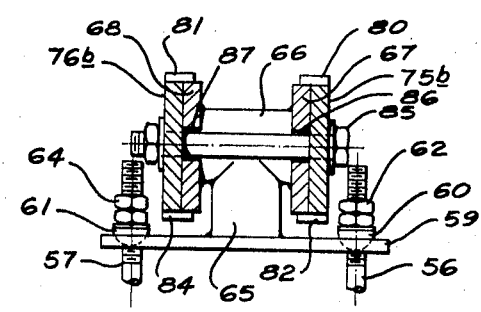
FIG. 8 is a broken vertical sectional view taken along the line 8—8 of FIG. 6.

The extent of such downward angular displacement of the abrading device 34 toward engagement with the side seam of the body tube 10 is limited by adjustment of stop or limit components in the form of a pair of threaded studs or bolts 56 and 57 that at their lower ends are welded or otherwise rigidly secured to a transversely disposed bracket 58 welded or otherwise affixed to the plate 40 at the outer or downstream end thereof. The studs 56 extend upwardly through openings provided therefor in an abutment element 59 that is transversely disposed and located beneath the main structure of the boom 29 to which it is pivotally adjustable, as seen best in FIG. 8. The openings in the abutment element 59 may be ball-shaped sockets that respectively seat therein complimentary shaped generally hemispherical stops 60 and 61 adjustably mounted upon the studs 56 and 57 for displacements along the length thereof. In the form shown, the stop elements 60 and 61 are slidably mounted upon the respectively associated studs, and the location of each stop is positively established by locknut assemblies 62 and 64 threadedly received upon the studs. Thus, the abrading device 34 can have the maximum downward position thereof raised by threading the locking nuts 62 and 64 downwardly upon the respectively associated studs, and the maximum downward position of the abrading device 34 can be raised by displacing the locknut assemblies outwardly toward the upper ends of the studs.

The ball-type interrelationship between the studs 56,57 and abutment element 59 permits limited articulation or generally universal angular displacements of the studs with respect to the abutment element which primarily accommodates limited longitudinal adjustments of the position of the abrading device 34 and plate 40 supporting the same along the axis of the boom structure 29. The amount of adjustment required to position the abrading device accurately with respect to other components of the apparatus is generally quite limited for any particular installation, so that the relatively angular displacements accommodated by the described interrelationship of the studs 56 and 57 with the abutment element 59 is adequate, even though the abutment element is fixedly related to the boom structure by means of a depending bracket 65 to which the abutment element is fixedly attached and which, in turn, is welded or otherwise rigidly secured to a tubular spacer 66 that extends between and is welded to the transversely spaced plate-like extensions 67 and 68 that project downstream from the tubular section 30 of the boom structure and comprises a part of the latter. The extensions 67 and 68 are further rigidified by longitudinally separated spacers 69 and 70 respectively disposed on opposite sides of the spacer 66.

Also supported along the boom structure 29 downstream of the abrading brush 34 is a tin-depositing mechanism generally denoted with the numeral 71. The mechanism 71 in the form shown is a flame spraying apparatus in which tin previously drawn into a wire 72 is supplied from a reel 74 rotatably supported between spaced apart brackets 75 and 76 forming a part of the boom structure 29. The tin wire 72 is advanced at a controlled rate into the flame spraying mechanism 71 upon demand, whereat a flame developed by fuel combustion melts the tin and a compressed air blast atomizes the molten metal and accelerates it through a nozzle 77 onto the inner surface of the body tube 10 generally along the edge portions 11 and 12 thereof, as shown in FIG. 1. The combustion gases, compressed air, and other supply requirements for the tin spraying mechanism 71 (other than the tin wire) are carried thereto via a plurality of conductors 78 and 79 which extend along the boom structure 29 to the supported end thereof. As respects the present invention, the flame spraying mechanism 71 may be conventional and, for example, may be one of the standard flame spraying machines for a wire metalizing process such as the type 3K Heavy Duty Metalizing Machine sold by Metco Inc. of Westbury, Long Island, New York.

The tin spraying mechanism 71 is longitudinally adjustable along the conveyor apparatus 18, it is transversely adjustable with respect thereto, and it is also angularly adjustable so that the nozzle 77 can have the outlet or discharge orifice thereof pointed downstream with respect to the direction of travel of the body tube 10 through the operating station along the conveyor apparatus. Considering first the longitudinal adjustability of the spraying mechanism 71, the brackets 72 and 75 defining a part of the boom structure 29 converge inwardly (see FIG. 3) from the relatively wide and generally parallel disposition thereof accommodating the mechanism 71 and reel 74 through intermediate portions 75a and 76a and terminate in transversely spaced and generally parallel portions 75b and 76b that respectively extend along the boom extensions 67 and 68 in substantially contiguous relation therewith. Along a part of their contiguous juxtaposition with the extensions 67 and 68, the bracket portions 75b and 76b are respectively equipped along the upper edges thereof with inwardly extending guide plates 80 and 81, and they are similarly equipped along the lower edges thereof with inwardly extending guide plates 82 and 84, as seen best in FIG. 8. Each of the guide plates is rigidly secured to the associated bracket portion, and it is in substantially contiguous relation with the associated extension 67 or 68, as the case may be. Thus, the brackets 75 and 76 are longitudinally slidable along the extensions 67 and 68 and, therefore, along the longitudinal axis of the boom structure 29.

The brackets 75 and 76 can be confined in any position of longitudinal adjustment by means of a bolt assembly 85 that extends transversely through openings provided therefor in the bracket portions 75b and 76b, and through longitudinally elongated slots 86 and 87 respectively provided in the extensions 67 and 68. Accordingly, the brackets 75 and 76 can be displaced longitudinally relative to the extensions 67 and 68 by loosening the bolt assembly 85, within the longitudinal limits defined by the slots 86 and 87, and the brackets can be fixedly secured in any position of adjustment by tightening the bolt assembly 85 to frictionally interlock the bracket portions 75b and 76b with the extensions 67 and 68. The guide plates 80,81 and 82,84 constrain the brackets 75 and 76 against angular displacements through a generally vertical plane relative to the extensions 67 and 68.

Figure 6:
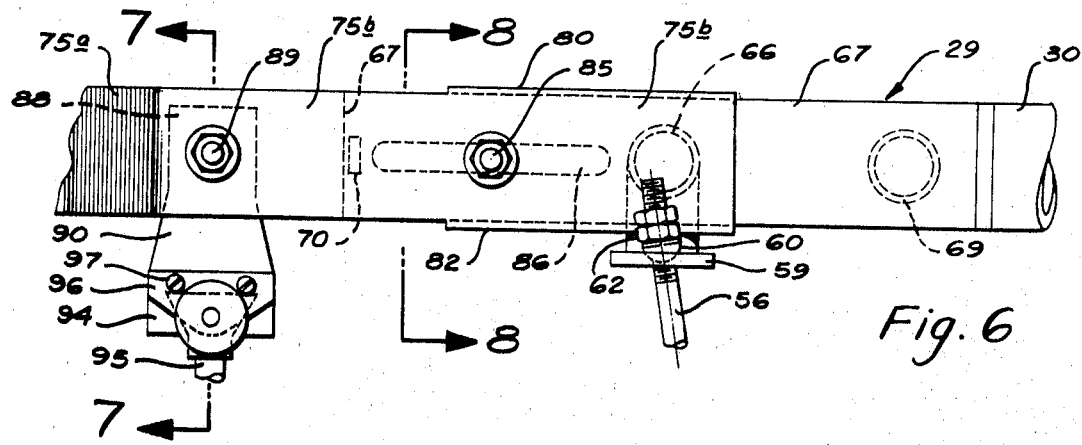
FIG. 6 is an enlarged, broken side view in elevation of the boom shown in FIGS. 2 and 3.
Figure 7:
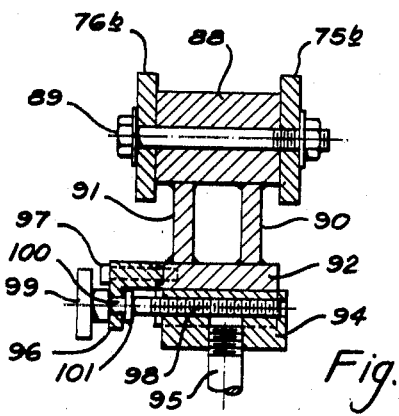
FIG. 7 is a broken vertical sectional view taken along the line 7—7 of FIG. 6.

As respects angular adjustment of the tin spraying mechanism 71, it is supported from the bracket portion 75b and 76b (see FIGS. 6 and 7 in particular) by means of a hanger structure associated therewith that includes a hanger support 88 disposed between the bracket extensions and serving also as a spacer therefor. A bolt assembly 89 extends through apertures provided for this purpose in the bracket extensions 75b and 76b and also through an opening or bore through the hanger support 88. Rigidly attached to the hanger support 88 and extending downwardly therefrom are a pair transversely spaced straps 90 and 91 that are fixedly secured to the mortise 92 of a dovetail joint that also includes a tenon 94. The dovetail joint 92,94 is disposed so that the tenon is transversely adjustable with respect to the mortise. The tin spraying mechanism 71 is supported from the tenon 94 by a support post 95 that is attached at its lower end to the spraying mechanism and at its upper end to the tenon as, for example, by being threadedly related thereto, as shown in FIG. 7.

Secured to the mortise 92 is a bearing or journal 96 fastened to the mortise along one side thereof by a plurality of cap screws 97. The adjustment journal 96 has an opening therein through which passes the shank of an adjusting screw having a threaded portion 98 received within a long threaded bore provided therefor in the tenon 94. The adjusting screw has an enlarged head 99 adapted to be manually gripped and rotated, and an unthreaded neck 100 of the screw is located within the opening in the journal 96. Axial displacements of the adjusting screw along the length thereof relative to the journal 96 are constrained in one direction by the head 99 and in the opposite direction by a stop 101 pinned or otherwise secured to the screw. It will be apparent that rotation of the adjustment screw causes the tenon 94 to be displaced with respect to the mortise 92 and in transverse directions relative to the conveyor apparatus 18 and boom structure 29, thereby enabling the transverse disposition of the spraying mechanism 71 to be selectively adjusted. Angular adjustments of the spraying mechanism 71 are accommodated by loosening the aforementioned bolt assembly 89 so as to permit the hanger support 88 to be angularly displaced relative to the bracket portions 75b and 76b spanning the same. Tightening the bolt assembly 89 frictionally locks the hanger support 88 in any position of adjustment.

In a typical installation, the tin spraying mechanism 71 is angularly disposed with respect to a vertical plane through the nozzle 77 such that the angle a indicated in FIG. 2 is in the range of about 5° to 10° and advantageously may be of the order of 8° with the discharge axis of the nozzle facing downstream by that amount, or toward the left as viewed in FIG. 2. In this same installation, the spacing between the nozzle 77 and inner surface of the edge portion 12 of the body tube 10 is approximately 1¼ inches. Again in the same installation, the center-to-center spacing between the welding electrodes 14,15 and abrading device 34, indicated by the distance D in FIG. 2, is approximately 41 inches, and the center-to-center spacing L between such electrodes and the nozzle of the spraying mechanism 71 is 68 inches.

Although it is not necessary that the surface to be metalized be heated before atomized metal is deposited thereon from the nozzle 77, as will be explained hereinafter, it is desired to reflow the deposited metal, and residual heat from the seam welding process is utilized in effecting such reflow of the atomized tin. In certain instances, it is desirable to supplement the residual heat resulting from the welding process, and this is especially true in the case of containers being formed of thinner gage metal which dissipates the heat quite rapidly by conduction through the body tube 10 from the immediate site of the seam weld at the overlapping edge portions 11 and 12. A typical means for supplying supplemental heat to the body tube 10 is illustrated in FIGS. 2 and 4, and it includes an open-flame burner 102 located between the transversely spaced rails 19 and 20 of the conveyor apparatus 18 at a position intermediate the welding electrodes 14, 15 and spraying mechanism 71. The burner 102 in the form shown is intended to have a suitable hydrocarbon fuel delivered thereto through a supply line 104 which will be equipped with the usual control valve (not shown) to permit the flow of fuel to the burner to be regulated.

In fabricating the body tube 10, the flat sheet of steel previously cut into a rectangular configuration and coated with tin 16 is rolled into the tubular form illustrated with the longitudinal edge portions 11 and 12 thereof overlapped, as shown in both FIGS. 1 and 2. The rolled sheet is then displaced by the conveyor mechanism 18 because the body tube rests upon the belts 27 and 28 (which may be equipped with lugs, if desired), and the overlapping edge portions 11 and 12 are advanced between the rotatable electrodes 14 and 15 which pass an electric current of sufficient magnitude through such overlapping edges to seam weld the same.

Subsequent to the welding operation, the body tube 10 is advanced through the scaling position or station defined by the abrading brush 34 which engages the inner surface of the tube along the welded edges thereof to remove slag and scale therefrom. The body tube 10 also passes through the heating station in heat exchange relation with the burner 102, whenever supplemental heat is required, to deliver supplemental heat to the surface of the body tube along the seam formed by the edge portions 11 and 12 thereof, although the band of heat supplied by the burner will be somewhat greater in transverse dimension and may encompass a transverse width of about 1 inch, for example (in certain cases in which the overlap is about one-eighth of an inch, the spray band may have an overall width of about one-fourth of an inch in which event the width of the heated area may be only about one-fourth of an inch).

The width of the heat band and the amount of heat delivered by the burner 102 will depend upon several variable parameters including, for example, the rate at which the body tube is advanced by the conveyor mechanism 18, the distance between the welding electrodes 14, 15 and the tin spraying mechanism 71, and the gage of the metal forming the body tube 10. In this respect, tin has a melting temperature of approximately 450°F, and it is desired to have the temperature of the body tube 10 along the band receiving tin spray from the nozzle 77 at a temperature sufficiently high to melt the spray deposited along the surface of the tube so as to reflow the spray-deposited layer of tin 17. It has been found, however, that it is best to keep the temperature of the body tube 10 below about 500°F because temperatures much in excess thereof tend to oxidize the tin coating.

Since the temperature of the body tube 10 along the longitudinally extending band that is somewhat wider in transverse extent than the overlapping edge portions 11 and 12 is above the melting temperature of tin, the tin globules sprayed against such surface from the nozzle 77 either remain molten or are melted subsequent to contact, but in either case, they reflow and merge with the adjacent edges of the tin coating 16 so that a substantially indistinguishable surface is presented by the two tin masses 16 and 17 along the interior of the body tube 10 to any food products subsequently packaged within the finished container comprising the same.

The described apparatus including the various adjustments which enable the requisite interrelationships to be observed of the center-to-center spacing of the welding dies 14,15 with the abrading device 34 and spraying mechanism 71, the rate of travel of the conveyor mechanism 18 and body tube 10 transported thereby, the angular disposition of the spraying mechanism and nozzle 77 thereof, the adjustment of the conveyor rails and belts 27 and 28 to prevent body tube climb, confinement of the bristles of the abrading device, and transverse adjustments of the abrading device and spraying mechanism for alignment purposes all contribute to the capability of the apparatus to provide high speed production with a minimum investment of set up time, with a very minimal loss of expensive tin, and with relatively little spoilage or loss of body tubes 10.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In apparatus for making the body tube for a relatively large metal container adapted to receive and store food products and the like therein from a metal sheet plated along one side thereof with a coating of tin and formed into a tubular configuration with the longitudinal edge portions thereof overlapping: conveyor mechanism adapted to support such body tube and transport the same downstream through an operating station; boom structure extending along said conveyor and supported relative thereto so as to pass through the interior of any such body tube transported by the conveyor through said operating station; welding mechanism disposed along said conveyor and operative to weld the overlapping edge portions of such body tube to secure the edge portions thereof one to another; means carried by said boom structure downstream of said welding mechanism for scaling the inner surface of such body tube along the welded edge portions thereof to clean the same; and tin spraying mechanism carried by said boom structure downstream of said welding mechanism and scaling means and being adapted to spray molten tin onto the inner surface of such body tube along the welded edge portions thereof.

2. The apparatus of claim 1 in which said conveyor mechanism is equipped with article-supporting means adapted to receive and support such body tube thereon; and in which said boom structure is disposed above said conveyor mechanism in spaced relation therewith.

3. The apparatus of claim 2 in which said conveyor mechanism includes a pair of transversely spaced conveyor belts defining the aforementioned article-supporting means adapted to support a body tube thereon, said conveyor mechanism further including adjustment means supporting said conveyor belts for selective relative vertical displacements therebetween.

4. The apparatus of claim 1 in which said means for scaling the inner surface of such body tube comprises a rotatably driven abrading device.

5. The apparatus of claim 4 in which said rotatably driven abrading device includes a wire brush equipped with confinement plates along the side walls thereof to constrain the bristles of said brush against transverse spreading.

6. The apparatus of claim 5 and further including means for supporting said abrading device for movements toward and away from any such body tube engaged thereby, the weight of said abrading device gravity-biasing the same toward operative engagement with such body tube.

7. The apparatus of claim 5 and further including motor means operatively connected with said abrading device for rotatably driving the same, the direction of rotation imparted to said abrading device being toward the upstream end of said conveyor mechanism along the surface of such body tube engaged by the abrading device so as to accelerate scale in a direction away from said tin spraying mechanism.

8. The apparatus of claim 5 and further including support means for said abrading device interconnecting the same with said boom structure, said support means being adjustably connected with said structure to enable said abrading device to be adjusted longitudinally with respect to said welding and spraying mechanisms.

9. The apparatus of claim 1 in which said tin spraying mechanism includes a nozzle disposed in relatively close proximity with the overlapping edge portions of any such body tube transported through such operating station, said nozzle being angularly disposed with respect to a vertical plane so as to angle slightly therefrom in a downstream direction along said conveyor mechanism.

10. The apparatus of claim 9 in which the angular orientation of said nozzle is of the order of 8° in the downstream direction from a vertical plane.

11. The apparatus of claim 9 and further including means interconnecting said spray mechanism and boom structure and providing both selective longitudinal and transverse adjustments of the spraying mechanism for selectively establishing the spacing between said nozzle and welding mechanism and for aligning said nozzle with the overlapping edge portions of any such body tube.

12. The apparatus of claim 1 and further including means disposed along said conveyor mechanism upstream of said spraying mechanism for adding supplemental heat to the overlapping edge portions of any such body tube transported by said conveyor mechanism.

13. The apparatus of claim 12 in which said means for adding supplemental heat includes an open-flame burner.

14. The apparatus of claim 1 in which said spraying mechanism includes a nozzle disposed in relatively close proximity to the overlapping edge portions of any such body tube transported by said conveyor means and is angularly disposed with respect to a vertical plane so as to face downstream along said conveyor mechanism, the angular disposition of said model being of the order of 8°, the rate of travel of said conveyor mechanism being of the order of 40 feet per minute, and the center-to-center spacing between said welding mechanism and nozzle being of the order of 68 inches.

15. The apparatus of claim 14 in which said scaling means includes a rotatably driven abrading disc rotated so as to accelerate scale removed thereby from such body tube upstream along said conveyor mechanism, the center-to-center spacing between said welding mechanism and abrading disc being of the order of 41 inches, the spacing between said nozzle and the overlapping longitudinal edge portions of any such body tube being approximately 1¼ inches.

* * * * *